June 23, 1970  G. A. SWARTZ  3,517,304
NON-DESTRUCTIVE TEST METHOD FOR DETERMINING DESTRUCTION
CHARACTERISTICS OF ELECTRICAL COMPONENTS
Filed Aug. 7, 1967

INVENTOR
GAYLORD A. SWARTZ
by: Wolfe, Hubbard, Voit &
Osann ATTYS

United States Patent Office 3,517,304
Patented June 23, 1970

---

3,517,304
NON-DESTRUCTIVE TEST METHOD FOR DETERMINING DESTRUCTION CHARACTERISTICS OF ELECTRICAL COMPONENTS
Gaylord A. Swartz, Independence, Kans., assignor, by mesne assignments, to Electra/Midland Corporation, Kansas City, Kans., a corporation of Delaware
Filed Aug. 7, 1967, Ser. No. 658,846
Int. Cl. G01r 31/00
U.S. Cl. 324—28                                       5 Claims

ABSTRACT OF THE DISCLOSURE

A non-destructive test method for determining the destruction characteristic of electrical components exhibiting dynamic characteristics which are dependent upon power stress. In one particular application, the method is used to determine the clear time of electrical current limiters, that is the time required for the current limiters to open the circuit when subjected to an overload. The dynamic characteristics of the current limiters which is used to determine the clear time in the non-destructive test is the voltage rise characteristic. In order to determine the relationship of the clear time to the voltage rise characteristic, a selected number of current limiters are subjected to an electrical pulse corresponding to a certain overload condition, and the height of the resulting voltage rise characteristic of each current limiter is measured at a selected point. Each of these current limiters is then subjected to a destructive signal corresponding to the same overload condition and blown to determine the actual clear times of the current limiters. The measured values of the height of the voltage rise characteristic and the clear times are then used to determine the relationship of the clear time to the measured height. Then additional current limiters are subjected to non-destructive electrical pulses corresponding to the same overload condition, and the height of the resulting voltage rise characteristic is measured and used to determine the clear time in accordance with the previously determined relationship of the clear time to the measured height of the voltage rise characteristic.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The present invention relates generally to the testing of electrical components and, more particularly, to an improved non-destructive test method for determining the blow characteristics of electrical current limiters and the like.

Heretofore, one of the principal problems in the production of current limiters has been precise and reliable predictability of their time-current characteristics. Standard electrical measurements have indicated the performance within certain limits, but the only exact test has been to subject one or more current limiters from each production batch to an actual overload to blow the limiter, while measuring the time required to open the circuit. However, such tests not only destroy the usefulness of the components subjected to the test, but also rely on the uniformity of each production batch to predict the properties of all the components in that batch from a few destructive tests.

It is, therefore, a primary object of the present invention to provide an improved non-destructive test method for predicting the behavior of electrical current limiters under overload conditions. A related object of the invention is to provide such a non-destructive test method which permits accurate and reliable testing of every production component, if desired.

Another object of this invention is to provide a non-destructive test method of the foregoing type which permits more reliable quality control in the production of electrical components exhibiting dynamic characteristics which are dependent upon power stress. In this connection, still another object is to provide such a non-destructive test method which provides valuable information for isolating the causes of variations between different production lots of such components.

Other objects and advantages of the invention will become apparent upon reading the following detailed description and upon reference to the drawings, in which.

Figure 1:
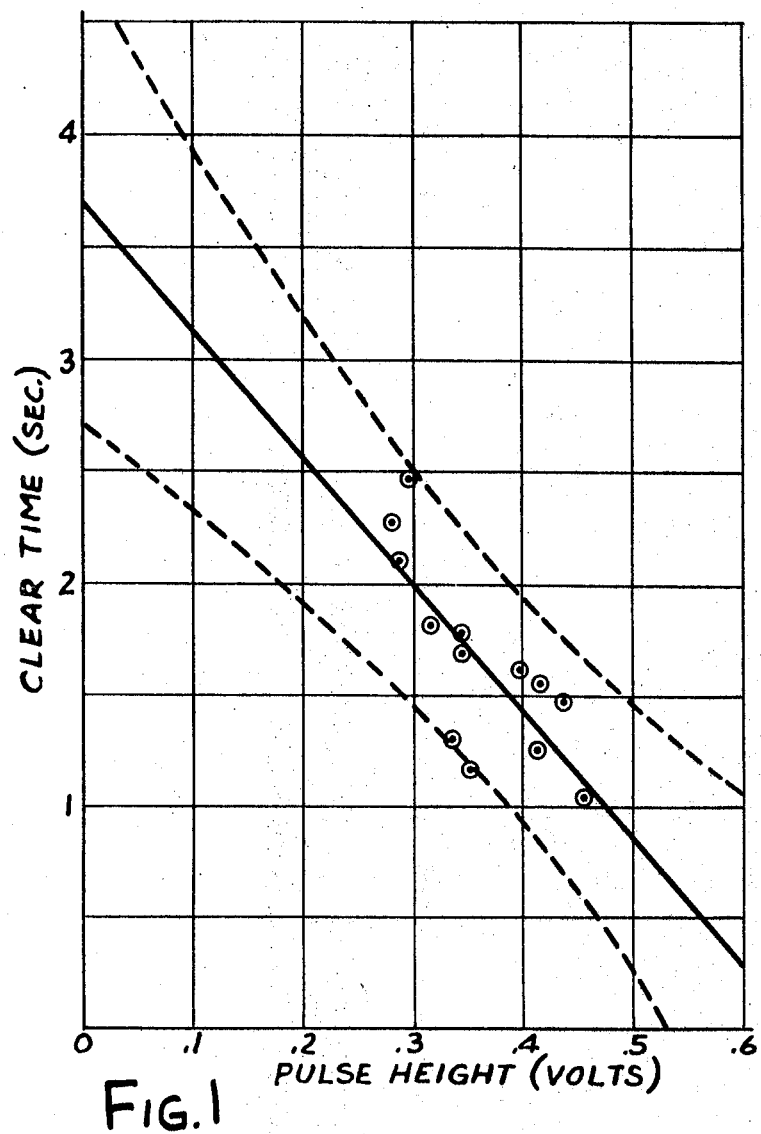
FIG. 1 is a graph of the regression line and 90% confidence lines for use in determining the clear time of a particular type of current limiter having a rated current of 0.5 ampere at an overload of twice its rated current, in accordance with the method of this invention.

While the invention will be described in connection with certain preferred embodiments, it will be understood that it is not intended to limit the invention to these particular embodiments. On the contrary, it is intended to cover all alternatives, modifications, and equivalents as may be included within the spirit and scope of the invention as defined by the appended claims.

In accordance with the present invention, a selected destruction characteristic of a given electrical component is determined by first determining the relationship of the selected destruction characteristic to a prescribed dynamic characteristic dependent upon power stress; the electrical component is then subjected to non-destructive power stress, the resulting prescribed dynamic characteristic is measured at a selected point, and the selected destruction characteristic represented by the measured dynamic characteristic is determined according to the previously determined relationship between the selected destruction characteristic and the prescribed dynamic characteristic. In the exemplary embodiment of the invention to be described below, it will be assumed that the particular electrical component being tested is a solid state current limiter. However, it is to be understood that this is merely one illustration, and that the non-destructive test method provided by this invention is also applicable to the testing of other electrical components, particularly those exhibiting dynamic characteristics which are dependent upon power stress.

Thus, in one particular application, this invention provides a method of determining the clear times (the time required by the current limiter to open the circuit after first being subjected to a given overload) of electrical current limiters by subjecting each of a plurality of similar current limiters to an electrical pulse corresponding to a predetermined overload condition; measuring the height of the resulting voltage rise characteristic of each current limiter at a selected point to provide a plurality of measured pulse heights; subjecting each of the current limiters to a destructive electrical signal corresponding to the predetermined overload until the current limiter is blown; measuring the clear time of each current limiter subjected to the destructive electrical signal; determining the relationship of the clear time of the current limiters to the measured pulse height based on the measured pulse heights and clear times; subjecting additional current limiters to non-destructive electrical pulses corresponding to the predetermined overload conditions; measuring the height of the resulting voltage rise characteristic of each of the additional current limiters at the same selected point to provide a measured pulse height for each current limiter; and determining the clear time represented by each measured pulse height according to the previously determined relationship of clear time to pulse height. In this particular application of the inventive method, the clear time of the current limiters is the selected destruction characteristic, and the voltage rise characteristic is the dynamic characteristic dependent upon power stress.

In order to establish the relationship between the clear time and the measured pulse height as accurately as possible, it is preferable to use the clear time and pulse height values measured in the initial destructive tests to calculate a regression line via the known "least squares" statistical method. (A regression line shows the variation in a dependent variable as a function of an independent variable selected by the experimenter.) One example of such a regression line is illustrated in FIG. 1, where the dependent variable is the clear time of the current limiter, and the independent variable is the height of a given point on the voltage rise characteristic of the current limiter for a predetermined test signal. This independent variable will be referred to hereinafter as the "measured pulse height," although it is to be understood that this height must always be taken at a particular point on the voltage rise characteristic for a particular current limiter subjected to a particular test signal.

Although this test method permits the non-destructive testing of any desired number of current limiters after the regression line has been determined, thereby permitting every current limiter to be individually tested if desired, a selected number of the current limiters must be destroyed initially to provide an appropriate number of measured clear time values for use in calculating the regression line. The particular number of components selected for the initial destructive tests depends on the degree of reliability desired, but it has been found that measurements obtained from the destruction of 10 to 20 components generally provide a reasonably reliable regression line.

Figure 2:
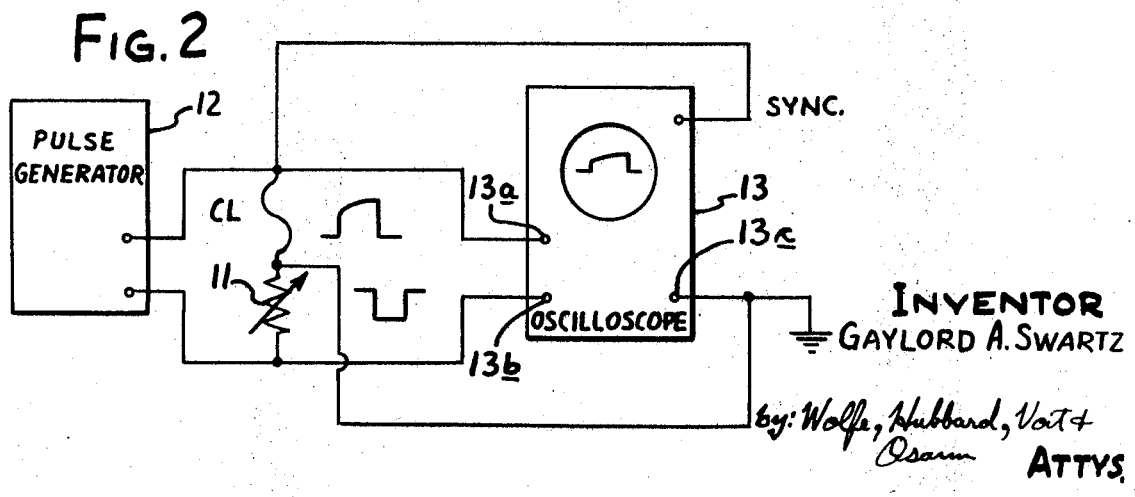
FIG. 2 is as schematic circuit diagram of an electrical system for carrying out the test method provided by this invention.

To obtain the data for a regression line of the type illustrated in FIG. 1, a selected number of similar current limiters are subjected to an electrical pulse corresponding to a particular load condition, and the resulting voltage rise characteristics are measured at a selected point to provide a plurality of measured pulse height values. (A suitable circuit for carrying out this portion of the test is illustrated in FIG. 2, which will be described below.) The length of the pulse applied to the current limiters in this stage of the test must be sufficiently short to avoid blowing or damaging the current limiter, while the pulse height is determined by $V = XIR$, wherein:

V is the height of the voltage pulse to be used in the test;
X is the overload factor;
I is the rated current for the current limiter; and
R is the room temperature resistance of the current limiter.

Thus, if a current limiter having a rated current of 0.5 ampere ($I = 0.5$) and a measured resistance of 0.9 ohm ($R = 0.9$) is to be tested for an overload of twice the rated current ($X = 2$), the height of the test pulse V is $0.5 \times 0.9 \times 2$, or 0.9 volt. The room temperature resistance value R should be measured by an instrument which does not cause appreciable heating of the junction of the current limiter, such as the Keithley Model 503 Milliohmmeter.

The preferred point for obtaining the measured pulse height values on the voltage rise characteristic of the current limiter is at the most dynamic portion of the characteristic. When a step function or square wave of current is applied to a current limiter, the resistance of the element rises exponentially approximately according to the relationship $Rt = Ro + R(1 - e - t)$ where $Rt$ is the total resistance at time $t$, $Ro$ is the initial cold resistance and R is the resistance due to heating of the junction. The most dynamic point on the resulting exponential curve is at the "knee" of the exponential rise, and thus it is preferred to obtain the measured pulse height values at that point.

After the measured pulse height values have been obtained for the selected number of current limiters, the same limiters are subjected to a destructive electrical pulse corresponding to the same overload condition. In this case, the applied pulse has the same height as the pulses applied initially to obtain the measured pulse height values, so as to represent the same overload condition, but the length of the pulse must be long enough to insure that the limiters are destroyed to open the circuit. This pulse is applied to the limiters one at a time, and the resulting clear time measured in each case. It is important that the applied pulse have a sharp square-wave shape so that the applied voltage is essentially constant over the entire test interval, thereby giving an accurate measurement of the clear time under the prescribed test conditions.

After the measured pulse height and clear time values have been obtained for the selected number of current limiters, a regression line such as that shown in FIG. 1 is determined by the "least square" method so as to establish an accurate relationship between clear time and measured pulse height. After the regression line has been determined for a given type of current limiter, any desired number of current limiters of the same type may be non-destructively tested by inserting each current limiter to be tested in the circuit illustrated in FIG. 2. This same circuit may also be used for the test described above for determining the regression line. Thus, the current limiter CL in FIG. 2 is connected in series with a standard variable resistor 11 adjusted to have a resistance value equal to the measured room temperature resistance ($R_0$) of the current limiter CL. The serially connected current limiter CL and resistor 11 are connected across the output terminals of a pulse generator 12 adapted to produce square pulses of adjustable height and length. To minimize effects of heating in the standard resistor the temperature coefficient of resistance of the standard resistor 11 should be small (e.g., less than 25 p.p.m./° C.) as compared with the temperature coefficient of resistance of the current limiter CL (e.g., 2500 p.p.m./° C. or greater).

The square pulses used for the non-destructive tests should have the same height as the pulses used in the destructive tests for determining the regression line, so as to represent the same overload condition. The length of the pulses in the non-destructive tests, however, must be considerably shorter than those used in the destructive tests so as to avoid blowing or damaging the current limiters; for example, it has been found that 400 milliseconds is a suitable pulse length for a 0.5-ampere current limiter tested at twice its rated load.

Each time a pulse is generated by the pulse generator 12 in FIG. 2, the resulting voltage drops across the standard resistor 11 and the current limiter CL are applied to an oscilloscope 13 connected across the resistor 11 and current limiter CL. More particularly, input terminal 13a of the oscilloscope is connected to the same output terminal of the pulse generator 12 which is connected to the current limiter CL, input terminal 13b of the oscilloscope is connected to output terminal 13b of the pulse generator which is connected to the standard resistor 11, and the ground terminal 13c of the oscilloscope is connected to a common point between the resistor 11 and the current limiter CL.

By setting the oscilloscope 13 input mode switch to the "Input A minus Input B" position, the voltage drop across the current limiter CL due to its initial resistance is cancelled by the corresponding voltage drop across the standard resistor 11, so that the resultant waveform on the oscilloscope screen represents the dynamic characteristic of the current limiter, or the changing resistance due to the heating of the current limiter junction under load. In other words, the voltage rise characteristic of the current limiter CL under a given overload condition, established by the pulse output from the generator 12, is displayed on the oscilloscope screen, and this display may be recorded by a conventional oscilloscope camera. The height of the voltage rise characteristic is measured at the same point used to determine the measured pulse heights in the tests described previously, e.g., at the knee of the exponential rise, and this measured height is then used to determine the clear time of the tested current limiter via the regression line. For example, using the regression line shown in FIG. 1, a measured height of 0.3 volt indicates that the mean clear time of the tested current limiter is 2.0 seconds at twice the rated current, accordng to the regression line, and the 90° confidence lines indicate that it can be expected with 90% confidence that the current limiter will have a clear time between 1.5 and 2.5 seconds when blown at twice its rated current.

Figure 3:
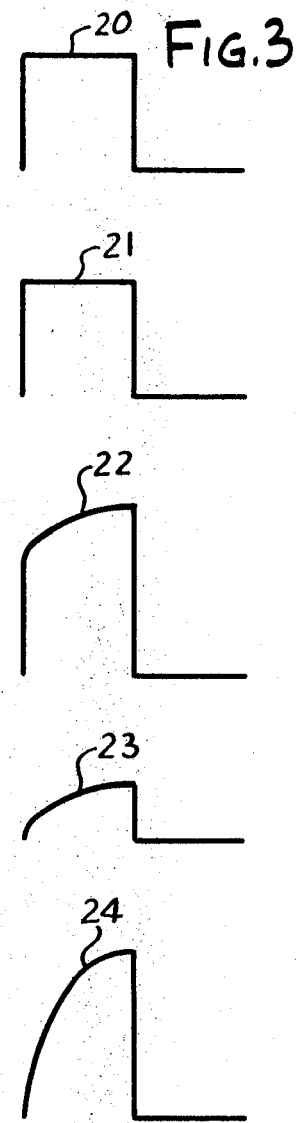
FIG. 3 is a series of representative pulse forms at various points in the circuit of FIG. 1 to illustrate the operation thereof.

The operation of the exemplary circuit in FIG. 2 may be more clearly understood by reference to FIG. 3, which illustrates a series of typical waveforms obtained in a typical non-destructive test carried out in circuit of FIG. 2. Thus, when a square pulse 20 is generated by the pulse generator 12, a similar square pulse 21 appears across the standard resistor 11, as seen on the screen of the oscilloscope 13. Waveform 22 appears across the current limiter CL, with the voltage rise characteristic of the current limiter CL being superimposed on top of the square wave 20. The voltage rise characteristic is due to the positive temperature coefficient of resistance of the current limiter junction, the magnitude of this coefficient typically being in the range of 2000 to 3000 p.p.m./° C. When the input mode switch of the oscilloscope 13 is set to the "Input A Minus Input B" position, the square wave 20 is, in effect, subtracted from the composite waveform 22, so that only the voltage rise characteristic 23 of the current limiter CL appears by itself on the screen of the oscilloscope 13. This voltage rise characteristic 23 may be amplified as illustrated by waveform 24 in order to permit more accurate measurement of the pulse height used to determine the clear time of the tested current limiter via the regression line.

To facilitate a clear understanding of the present invention, the method of determining the regression line from the measured pulse height and clear time values will be described in more detail in connection with a specific example. Thus, thirteen current limiters rated at 0.5 ampere, all from the same production batch, were measured for cold resistance values with a Keithley Model 503 Milliohmmeter. The measured values of cold resistance ($R_0$) are listed in the table on the following page. A standard resistor having a resistance equal to the measured cold resistance of the current limiter was then connected in series with each current limiter, and the series combination was connected to the output of a pulse generator adapted to produce sharp square pulses of adjustable height and length. The current limiter, resistor, and pulse generator were then connected to a Tektranix Model No. 545A oscilloscope, equipped with a recording camera, as illustrated in FIG. 2.

In order to test the current limiters at twice the rated load, the pulse generator was set to produce a pulse height of 0.91 volt (overload factor of 2 times rated current of 0.5 amp, times resistance of 0.91 ohm). With the pulse height thus adjusted to the desired overload condition, the pulse generator was set to produce a pulse length of 400 milliseconds, which was known to be considerably shorter than the clear time of the current limiters being tested. Next, the oscilloscope input mode switch was set to "Input A Minus Input B" so that the voltage drop across the standard resistor was subtracted from the voltage drop across the current limiter due to the overload. With the viewing port closed, the camera shutter was opened and the pulse generator triggered to produce one pulse.

TABLE I

| CL No | $R_0$ (Ω) cold resistance | $X_i$ (volts) pulse height | $Y_i$ (sec.) clear time | $X_i^2$ | $Y_i^2$ | $X_iY_i$ |
|---|---|---|---|---|---|---|
| 1 | .91 | .333 | 1.31 | .110889 | 1.7161 | .43623 |
| 2 | .90 | .412 | 1.25 | .169744 | 1.5625 | .51500 |
| 3 | .90 | .399 | 1.62 | .159201 | 2.6244 | .64638 |
| 4 | .90 | .297 | 2.46 | .088209 | 6.0516 | .73062 |
| 5 | .91 | .454 | 1.05 | .206116 | 1.1025 | .47670 |
| 6 | .91 | .285 | 2.13 | .081225 | 4.5369 | .60705 |
| 7 | .91 | .341 | 1.79 | .116281 | 3.2041 | .61039 |
| 8 | .91 | .355 | 1.17 | .126025 | 1.3689 | .41535 |
| 9 | .90 | .343 | 1.71 | .117649 | 2.9241 | .58653 |
| 10 | .92 | .315 | 1.80 | .099225 | 3.2400 | .56700 |
| 11 | .91 | .280 | 2.31 | .078400 | 5.3361 | .64680 |
| 12 | .90 | .415 | 1.55 | .172225 | 2.4025 | .64325 |
| 13 | .91 | .436 | 1.49 | .190096 | 2.2201 | .64964 |
| Total | 11.79 | 4.665 | 21.64 | 1.715285 | 38.2898 | 7.53094 |

The pulse in inches was measured directly from the resulting photograph, using the knee of the curve as the point of measurement. To convert the pulse height in inches to volts, the measured valve was multiplied by the attenuation factor for the oscilloscope (0.5 volt/cm. times 2.54 cm./inch), multiplied by the photo reduction factor (2.5). This procedure was repeated for each of the thirteen sample current limiters, and the resulting products are recorded in the aforementioned table as $X_i$.

To determine the clear times of the current limiters, an overload current of twice the rated value was applied to each current limiter until an open circuit occurred, with the clear time being measured in seconds in each case. The resulting measured clear time values are recorded in the table as $Y_i$.

After the above measurements had been made and recorded, the $X_i$ and $Y_i$ data points were plotted on Cartesian coordinates as shown by the points ⊙ in FIG. 1. The plot of the points indicated that a linear fit of a function to the data was the best estimation of the relationship. To minimize the error in estimating the linear fit of the data and to give a maximum likelihood linear fit, the "least squares" method of statistical analysis was used to determine the relationship of pulse height, the independent variable, to clear time, the dependent variable. The regression line calculated by this method is shown as a solid line in FIG. 1, and was calculated using the data in the aforementioned table as follows:

N = Size of sample
$\Sigma X_i$ = Sum of the N observations of the independent variable
$\Sigma Y_i$ = Sum of the N observations of the dependent variable
$\Sigma X_i^2$ = Sum of the squares of the independent variable
$\Sigma Y_i^2$ = Sum of the squares of the dependent variable
$\Sigma X_iY_i$ = Sum of the cross products $$\overline{X} = \frac{\Sigma X}{N^i}$$

where N is the number of units $$\overline{Y} = \frac{\Sigma Y}{N^i}$$

where N is the number of units $$S_x = \sqrt{\frac{\Sigma X_i^2 - \frac{(\Sigma X)^2}{N^i}}{N-1}} = \text{The standard deviation estimate of } X$$

$$S_y = \sqrt{\frac{\Sigma Y_i^2 - \frac{(\Sigma Y)^2}{N^i}}{N-1}} = \text{The standard deviation estimate of } Y$$

$$b = \frac{\Sigma X_iY_i - \frac{\Sigma X_i \Sigma Y_i}{N}}{\Sigma X_i^2 - \frac{(\Sigma X)^2}{N^i}} = \text{The slope of the regression line}$$

$\overline{Y}_x = \overline{Y} + b(X - \overline{X}) =$ The estimated linear regression line $S_{y/x} = \sqrt{\frac{N-1}{N-2}(S_y^2 - b^2 S_x^2)} =$ The standard estimate of error when given the value of $X$ $$\left[\overline{Y}_x + t_{1/2} \alpha S_{y/x} \sqrt{1 + \frac{1}{N} + \frac{(X-\overline{X})^2}{(N-1)S_x^2}}\right]$$

$$< Y < \left[\overline{Y}_x + t_{1-\frac{1}{2}\alpha} S_{y/x} \sqrt{1 + \frac{1}{N} + \frac{(X-\overline{X})^2}{(N-1)S_x^2}}\right]$$

The estimated limits expected for individual Y values for given X values $\overline{X} = .359$
$S_x^2 = .003439$
$S_x = .059$
$\overline{Y} = 1.665$
$S_y^2 = .188960$
$S_y = .435$ (1) The slope of the regression line.

$$b = \frac{\Sigma X_i Y_i - \frac{\Sigma X_i \Sigma Y_i}{N}}{\Sigma X_i^2 - \frac{(\Sigma X_i)^2}{N}} = \frac{7.53094 - \frac{(4.665)(21.64)}{13}}{1.715285 - \frac{(4.665)^2}{13}} = 5.682$$

(2) The estimated regression equation.

$$\overline{Y}_x = \overline{Y} + b(x - \overline{x}) = 1.665 + (-5.682)$$
$$(x - .359) = 3.705 - 5.682$$

The estimate of standard error.

$$S_{y/x} = \sqrt{\frac{N-1}{N-2}(S_y^2 - b^2 S_x^2)}$$
$$= \sqrt{\frac{12}{11}(.188960 - .111029)} = .291$$

(3) The 90% confidence limits for individual Y values for given X values.

$$\left[\overline{Y}_x + t_{-.05} S_{y/x} \sqrt{1 + \frac{1}{N} + \frac{(x-\overline{x})^2}{(N-1)S_x^2}}\right]$$

$$< Y < \left[\overline{Y}_x + t_{.05} S_{y/x} \sqrt{1 + \frac{1}{N} + \frac{(x-\overline{x})^2}{(N-1)S_x^2}}\right]$$

Where $t_{-.05}$ and $t_{.95}$ are taken from a $t$ distribution table.

$$\left[3.705 - 5.682X - 1.796(.291)\sqrt{1 + \frac{1}{13} + \frac{(X-.359)^2}{(13-1)(.003439)}}\right]$$

$$< Y < \left[3.705 - 5.682X + 1.796(.291)\right.$$

$$\left.\sqrt{1 + \frac{1}{13} + \frac{(X-.359)^2}{(13-1)(.003439)}}\right]$$

EXAMPLE

Given $X = .333$ $$1.813 - .548 < Y < 1.813 + .548$$
$$1.265 \text{ Sec.} < Y < 2.361 \text{ Sec.}$$

The regression equation ($\overline{Y}_x = A + BX$) has two parameters, of which $\overline{Y} - b\overline{X}$ is the unbiased estimate of A, and $b$ is the unbiased estimate of B. In the example A was found to be $1.665 + 5.682 (.359)$ or $3.705$ and B to be $-5.682$. Letting $\overline{Y}_x$ denote the estimate of the mean Y when X is given:

$$\overline{Y}_x = 3.705 - 5.682X$$

Since the regression line in FIG. 1 is not a strict relationship, but a best fit, and since it is necessary to know what interval will include $100(1-)\%$ of the population, it is necessary to know something of the variation about the line. This is accomplished by the algebraic formula for $S_{y/x}$, which is the standard estimate of error.

The interval that gives 90% confidence for the individual Y value when X is known, is given by Formula 3. Having calculated several of the intervals for several Y values, the estimate of the envelope can be drawn. The envelope for this example is shown in broken lines in FIG. 1. This envelope is estimated to include 90% of the remaining population.

This invention provides a non-destructive test method which permits reliable quality control in the production of electrical components exhibiting dynamic characteristics which are dependent upon power stress. For example, the non-destructive test method can be used to predict the behavior of electrical current limiters under overload conditions and, in fact, permits accurate and reliable testing of every production component if desired. This method provides valuable information for isolating the causes of variations between different production lots of the tested components.

I claim as my invention:

1. A method of determining the clear times of electrical current limiters, which method comprises the combination of subjecting each of a plurality of similar current limiters to an electrical pulse corresponding to a predetermined overload condition, measuring the height of the resulting voltage rise characteristic of each current limiter at a selected point to provide a plurality of measured pulse heights, subjecting each of said current limiters to a destructive electrical signal corresponding to said predetermined overload condition until the current limiter is blown, measuring the clear time of each current limiter subjected to said destructive electrical signal, determining the relationship of the clear time of said current limiters to the pulse height based on the measured pulse heights and clear times.

2. A method of determining the clear times of electrical current limiters, which method comprises the combination of subjecting each of plurality of similar current limiters to an electrical pulse corresponding to a predetermined overload condition, measuring the height of the resulting voltage rise characteristic of each current limiter at a selected point to provide a plurality of measured pulse heights, subjecting each of said current limiters to a destructive electrical signal corresponding to said predetermined overload condition until the current limiter is blown, measuring the clear time of each current limiter subjected to said destructive electrical signal, determining the relationship of the clear time of said current limiters to the pulse height based on the measured pulse heights and clear times, subjecting additional current limiters to non-destructive electrical pulses corresponding to said predetermined overload condition, measuring the height of the resulting voltage rise characteristic of each of said additional current limiters at said selected point to provide a measured pulse height for each current limiter, and determining the clear time represented by each measured pulse height according to the previously determined relationship of clear time to pulse height.

3. A method of determining the response characteristic of electrical current limiters to a given destructive condition, which method comprises the steps of determining a regression line for said current limiters using the voltage rise characteristic of the current limiters in response to a square test pulse as the independent variable and the clear time of the current limiters as the dependent variable, subjecting said current limiters to a predetermined non-destructive test signal and measuring said voltage rise characteristic of the current limiters in response to said signal, and determining the clear time of said current limiters by locating the measured voltage rise characteristic on said regression line.

4. A method as defined in claim 3 in which said regression line is determined by subjecting a plurality of current limiters of the same type to destructive pulses of known height, measuring the clear times of said current limiters, and determining a regression line for said current limiters using the pulse heights as the independent variable and the measured clear time as the dependent variable.

5. A method of determining a selected destruction characteristic of electrical components, which method comprises subjecting each of a plurality of similar electrical components to a non-destructive electrical signal corresponding to a predetermined overload condition, measuring a prescribed dynamic characteristic of each of said electrical components at a selected point representing the response of each component to said non-destructive electrical signal to provide a plurality of measured values of said dynamic characteristics, subjecting each of said electrical components to a destructive electrical signal corresponding to said predetermined overload condition, measuring a prescribed destruction characteristic of each of said electrical components in response to said destructive electrical signal to provide a plurality of measured values of said destruction characteristic, determining the relationship of said destruction characteristic to said dynamic characteristic, subjecting additional similar electrical components to non-destructive electrical signals corresponding to said predetermined overload condition, and measuring said prescribed dynamic characteristic of each of said additional electrical components at said selected point representing the response of each component to said non-destructive electrical signal for determining said destruction characteristic of said additional components according to the previously determined relationship of said destruction characteristic to said dynamic characteristic.

References Cited

G.E. Transistor Manual (6th edition), Mar. 20, 1962, pp. 300–301.

Motorola Power Transistor Handbook (first edition), 1961, pp. 32–33.

RUDOLPH V. ROLINEC, Primary Examiner

EDWARD L. STOLARUN, Assistant Examiner

U.S. Cl. X.R.

324—158